March 26, 1929.  S. LÖFFLER  1,707,125

HIGH PRESSURE SLIDE VALVE

Filed Aug. 5, 1926

Inventor
Stephan Löffler.
By William C. Sinton.
Attorney.

Patented Mar. 26, 1929.

1,707,125

UNITED STATES PATENT OFFICE.

STEPHAN LÖFFLER, OF CHARLOTTENBURG, NEAR BERLIN, GERMANY.

HIGH-PRESSURE SLIDE VALVE.

Application filed August 5, 1926, Serial No. 127,425, and in Germany August 19, 1925.

This invention provides an improved high-pressure stop valve, specially suitable for shutting off high pressure and highly superheated steam, in which a single closing member is brought into the closed position, opposite to the direction of flow, by imparting thereto a combined vertical and lateral movement through the agency of guide members attached to the control spindle and operating like a toggle joint.

An essential feature of the invention is the manner of transmitting power from the guide members to the closing member through the agency of a centrally disposed movable intermediate member which transmits the laterally operating forces of the guide members to the closing member in a perfectly centric manner.

Irregularities, such as changes of shape in the guide members through the effects of temperature or wear, are rendered innocuous as regards a tight closure of the valve by the circumstance that the closing member is guided centrally in the admission orifice of the casing, shortly before closing and until completely closed, independently of the intermediate member.

At the same time, in closing and opening the valve, the toggle-link forces are transmitted directly to guide ledges situated in the valve casing.

Figure 1:
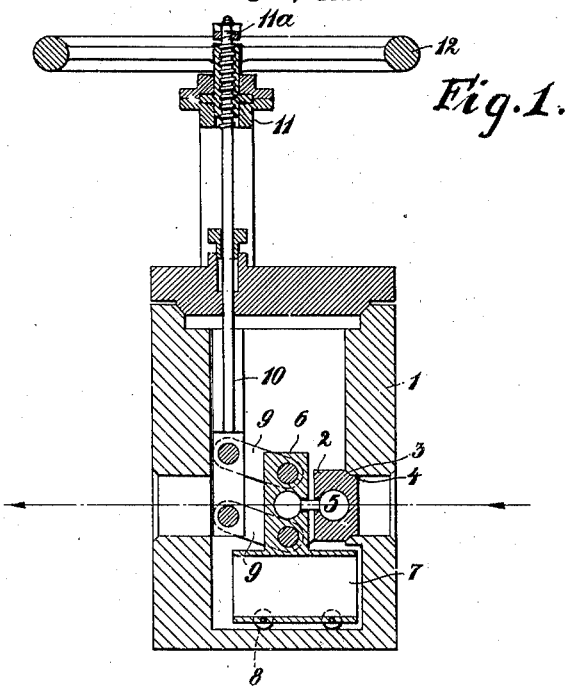
Figure 2:
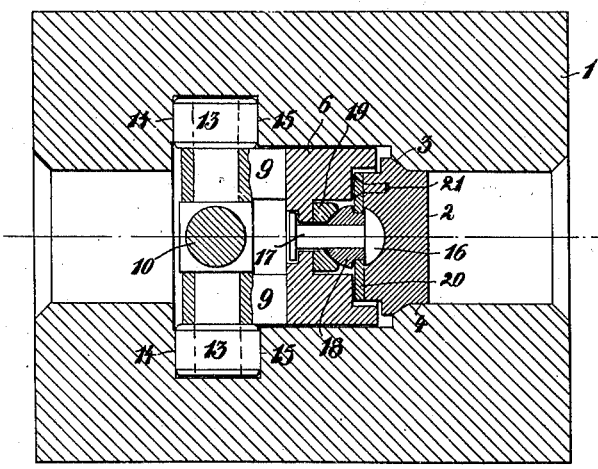

The invention is illustrated diagrammatically and by way of example on the accompanying drawing in which Figure 1 is a vertical section through one constructional form of the improved high-pressure stop-valve, and Figure 2 a horizontal section through a modification.

Referring to Fig. 1, 1 denotes the valve casing, 2 the closing member which makes a tight joint at 3, by means of a sharp or taper edge, against the direction of flow, and is centered at 4 in the admission orifice of the valve casing. Said closing member is articulated to a guide block 6 by an articulation 5 intended to render this centering of the member in the flow orifice of the casing independent of the position of the guide block. The latter terminates in a tube 7, which affords unrestricted passage to the flow of steam through the casing when the valve is open. Under the tube 7 are rollers 8, which take up the vertical forces of two pairs of toggle links 9:9 by means of which power is transmitted from the control spindle 10 to the guide block 6. The drawing shows an upright spindle actuated by a nut 11 and hand wheel 12. The action of the toggle links can be limited by a counter nut 11ª. In the horizontal section shown in Fig. 2, the reference numerals denote the same parts as in Fig. 1. In addition, 13 are guide rollers with cylindrical or other conveniently shaped rolling surfaces by means of which the toggle links pressure act, directly on the valve casing, against the ledge 14 as regards the closing forces, and against the ledge 15 as regards the opening forces. 16 is a hemispherical member fitting in the valve body and terminating in a bolt, the head-piece 17 connecting it with the guide block 6. 18 is the supplementary hemispherical member seated in a bearing cup 19. Said member in conjunction with the member 16, enables the valve body to turn in all directions. The bearing cup 19 wherein the ball member 18 is mounted, enables the guide block 6 to shift laterally in relation to the closing member 2. The closing member is connected with the ball member 16 by means of a plate 20 and screws 21.

Having now particularly described and ascertained the nature of my said invention and in what manner the same is to be performed, I declare that what I claim is:—

1. A high-pressure stop valve comprising in combination a valve casing having an inlet and outlet port, a valve for closing said inlet port, a vertically movable control spindle, a guide block, a toggle-joint connection between said guide block and said spindle, and a rotatable connection between said valve and said guide block whereby said valve may be vertically withdrawn from said inlet opening or forced laterally into said inlet opening for closing same.

2. A high-pressure stop valve comprising a casing having an inlet and outlet opening therein, a valve closing for the inlet opening thereof, a vertically movable control spindle, a guide block, a toggle-joint connection between said guide block and said spindle, and an intermediate member for connecting said valve to said guide block whereby said valve is capable of being shifted laterally, at right angles to the direction of travel of said control spindle and rotated with relation to said guide block.

3. A high-pressure stop valve comprising in combination a casing having an inlet and outlet opening therein, a valve for closing said inlet opening, a vertically movable control spindle, a guide block, a toggle-joint connection between said guide block and said spindle, means for connecting said valves to said guide block, whereby said valve will be guided centrally in relation to the inlet opening of said valve casing prior to and while the valve is seated within said inlet opening of the casing, and said valve being capable of being withdrawn vertically from the inlet opening of said casing when the said valve is in its open position.

4. A high-pressure stop valve comprising in combination having an inlet and outlet opening therein, a valve for closing said inlet opening, a vertically movable control spindle, a guide block, toggle links connecting said guide block with said spindle, a tube formed with said guide block and adapted to establish a direct communication between the inlet and outlet openings of said casing, and means for rotatably connecting said valve with said guide block.

5. A high-pressure stop valve comprising in combination a casing having an inlet and outlet opening formed therein, a valve for closing the inlet opening of said casing, a vertically movable control spindle, a guide block, a toggle joint connection between said guide block and said spindle, a tube formed with said guide block, means for connecting said valve with said guide block, and said tubes being adapted to engage the valve casing for limiting the downward movement of said guide block whereby when pressure is applied to said control spindle said valve will be caused to move laterally into the seated position within said inlet opening.

6. A high-pressure stop valve comprising in combination a casing having an inlet and outlet opening therein, a control spindle, a guide block, toggle links connecting said guide block wtih said spindle, a tube formed with said guide block and adapted to establish a communication between said inlet and outlet openings, rollers mounted upon said tube, means for rotatably connecting said valve with said guide block, guide rollers carried by said toggle links and said casing having ledges formed therein in which may travel said guide rollers substantially as and for the purpose specified.

In witness whereof I have hereunto set my hand.

STEPHAN LÖFFLER.